3,201,426
3-KETO-Δ⁴-6-CYANOAMINO STEROIDS

George A. Boswell, Jr., Newark, and Richard M. Scribner, Wilmington, Del., assignors to E. I. du Pont de Nemours and Company, Wilmington, Del., a corporation of Delaware
No Drawing. Filed Aug. 27, 1963, Ser. No. 304,946
8 Claims. (Cl. 260—397.2)

This invention relates to new steroids, specifically, cyanoamino-substituted steroids, and to a method of preparing these compounds.

The synthesis and study of steroids is of unusual interest because of their many and interesting properties; however, no cyanoamino-substituted steroids have been reported previously. The new products of this invention are 3-keto-Δ⁴ steroids having a cyanoamino, —NHCN, substituent on the carbon atom in the 6-position. In these compounds, therefore, the portion of the steroid molecule comprising the 3- to 6-positions, inclusive, is the 3-keto-Δ⁴-6-cyanoamino atomic grouping,

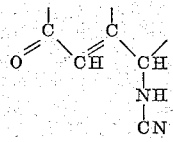

These products are prepared by a process which comprises oxidizing under essentially anhydrous, alkaline conditions, a 3-hydroxy-5,6-N-cyanoaziridino steroid, i.e., a 3-hydroxy steroid in which the steroid nucleus is fused at the 5 and 6 carbon atoms to an aziridine nucleus whose nitrogen atom has its third valence satisfied by a cyano group. This reaction, which is a combination of oxidation and ring-opening reactions, is represented by the following equation, in which only the portion of the steroid comprising positions 3 to 6 is shown:

(1)
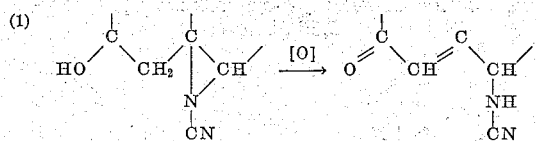

In this discussion, the spatial configuration (α or β) of the cyanoamino group and its precursor, the N-cyanoaziridino group, is omitted. The configuration has not been proved rigorously. The initial 3-hydroxy group can have either the α or β configuration.

The 3-keto-Δ⁴-6-cyanoamino steroids of this invention may bear substituents only in the 10, 13 or 17 positions. The 13-position is substituted with a methyl group, and the 10-position may bear a hydrogen or a methyl group. The 17-position may bear the following groups in the β position:

—COCH₃, —COCH₂OAc, —OAc, —CH—(CH₂)₃—CH(CH₃)₂,
                                  |
                                  CH₃

—CH—(CH₂)₂—CH—CH(CH₃)₂, —CH—(CH₂)₂—CH—CH(CH₃)₂,
  |                |                |                |
  CH₃              CH₃              CH₃              C₂H₅

—OH and —CH(OAc)CH₃ while the α position can be —H, —CH₃ or —OAc. OAc represents an acetoxy group. In addition, the 17 position may be substituted with a carbonyl (=O) group.

The compounds of the invention are prepared by oxidizing a 3-hydroxy-5,6-N-cyanoaziridino steroid, having the above substituents.

In order to avoid hydrolysis of the N-cyanoaziridine ring and cleavage of the C≡N bonds, the 3-hydroxy group is oxidized under essentially anhydrous conditions and in an alkaline liquid medium. Such conditions have previously been used in the steroid art to oxidize hydroxyl groups without affecting acid-sensitive substituents present in the steroid molecule. In the present case, however, it was unexpectedly found that, under these conditions, opening of the aziridine ring with formation of a 6-cyanoamino group and of a double bond between the 4 and 5 carbon atoms occurs simulttneously with the oxidation of the 3-hydroxyl group.

The oxidizing agent of choice to effect this combined reaction is a chromium trioxide/tertiary nitrogen base complex of the type previously described in the literature, for example, by Sisler et al., J. Am. Chem. Soc., 70, 3827 (1948), and in British Patent 733,808. Suitable examples are the CrO₃ complexes of pyridine, the picolines, the lutidines, quinoline, diethylformamide and triethylamine. Of these, the preferred reagent is the CrO₃/pyridine complex, which has the composition CrO₃·2C₅H₅N, and, for simplification, the process will be discussed with reference to this specific reagent in the following paragraphs. A convenient preparation of the CrO₃/pyridine complex is described by Poos et al. in J. Am. Chem. Soc., 75, 427 (1953).

The oxidizing agent (CrO₃) should be used in at least equimolar amounts with respect to the 3-hydroxy-5,6-N-cyanoaziridino steroid. It is generally used in excess thereover, e.g., in amounts of 2–5 moles per mole. The CrO₃/pyridine complex, which is moderately soluble in pyridine, is used as a suspension in pyridine, this solvent being normally the only one used as the medium for the reaction with the N-cyanoaziridino steroid, although an additional inert solvent can be used if desired.

The oxidation reaction does not require elevated temperatures and it is most conveniently conducted in the temperature range of 0–30° C., although moderate heating, e.g., up to 75° C., can be applied if desired. Substantial conversions are obtained after a few hours contact at room temperature, and it is usually unnecessary to prolong the reaction time beyond 24 hours. Other secondary hydroxyl groups that may be present in the steroid molecule besides the 3-hydroxy group are also usually converted to carbonyl groups during the reaction.

The reaction product is most conveniently isolated by pouring the reaction mixture into acidified water or, preferably, into water buffered to a slightly acid pH, followed by extraction of both of the resulting aqueous and solid phases with an appropriate organic solvent. The extract is evaporated to yield the 3-keto-Δ⁴-6-cyanoamino steroid, which can be purified by recrystallization if necessary.

The steroidal starting materials in the process of this invention are the 3-hydroxy steroids in which the carbon atoms in the 5- and 6-positions are also the two ring carbons of the N-cyanoaziridine structure. These materials can therefore be called 5,6-N-cyanoaziridino steroids. They are prepared by the method described in application Serial No. 234,878, filed by F. D. Marsh on November 1, 1962, which consists in reacting cyanogen azide with a 3-hydroxy steroid having an intracyclic double bond between the 5 and 6 carbons, in accordance with the illustrative simplified equation (2)
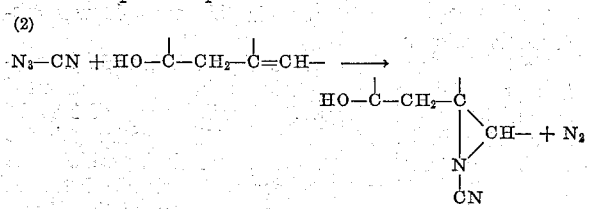

This reaction is preferably carried out by treating a solution of the unsaturated 3-hydroxy steroid in an inert solvent such as acetonitrile, ethyl acetate, toluene, methylene chloride, carbon tetrachloride, etc., with a solution of cyanogen azide in an inert solvent such as one of those already mentioned. The cyanogen azide is used in amounts of at least one-half mole per mole of unsaturated steroid, normally in at least molar equivalent, and preferably in slight to moderate excess thereover. The reaction can be conducted at temperatures ranging from about 25° C. to about 75° C., but temperatures between 40 and 60° C. are preferably used. Its progress can be followed by determining the amount of nitrogen evolved. The reaction product can be isolated and purified by chromatography on neutral activated alumina and/or crystallization from an appropriate solvent.

The cyanogen azide used to prepare the 3-hydroxy-5,6-N-cyanoaziridino steroids is prepared by reacting a caynogen halide, preferably cyanogen chloride, with a metal, ammonium or organoammonium azide, preferably sodium azide, under anhydrous conditions, at a temperature in the range of −50° C. to +25° C. The cyanogen azide product is a colorless, unstable liquid which, when isolated, is explosively sensitive to heat or shock. However, its solutions in organic solvents are not explosive and can be stored, handled and used with safety. A typical preparation of cyanogen azide in solution is as follows:

A mixture of sodium azide (16.25 g., 0.25 mole) and dry acetonitrile (48.5 g.) is placed in a flask equipped with a condenser, thermometer, magnetic stirrer, gas inlet tube and nitrogen bubbler. The flask is cooled to −10 to 0° C. and ice-water or a coolant at −5 to 0° C. is circulated through the condenser. Cyanogen chloride (24.0 g., 0.39 mole) is distilled into the flask with good stirring at such a rate as to maintain the temperature below 12° C. After completion of the addition, the mixture is stirred for 0.5 hour at 0–10° C. and then allowed to warm slowly to room temperature. Excess cyanogen chloride is removed by evacuation through the cooled condenser at 95–120 mm. pressure for about 1 hour, with stirring. The solution which remains in the flask is filtered under nitrogen and the filter cake is washed twice with a total of 10 ml. of dry acetonitrile. The combined filtrate is a solution of cyanogen azide in acetonitrile which can be used directly or stored under nitrogen at −20° C. for subsequent use.

Solutions of cyanogen azide in any other anhydrous solvent such as ethyl acetate, benzene, acetone, etc., can be prepared in a similar manner.

The following examples illustrate the invention.

*Example 1.—6-cyanoamino-4-pregnene-3,20-dione (6-cyanoaminoprogesterone)*

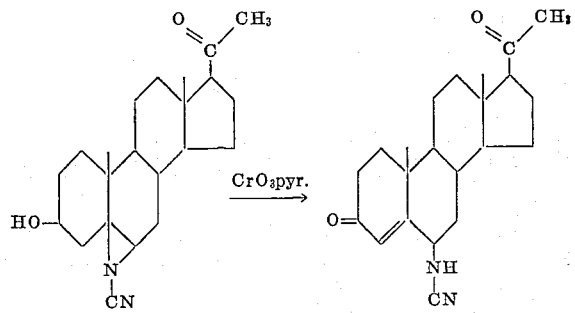

The starting material used in this example was prepared as follows:

To a solution of 8.0 g. (25.3 millimoles) of 3-hydroxy-5-pregnene-20-one (pregnenolone) in 100 ml. of ethyl acetate was added 10 ml. (28.5 millimoles) of 2.85 M cyanogen azide in ethyl acetate. The reaction mixture was heated at 52±2° C. for 46 hours, during which time 660 ml. (27 millimoles) of gas was evolved. Fltration of the reaction mixture and evaporation of the filtrate gave 9.2 g. of amber gum. This was dissolved in 13 ml. of ethyl acetate and the solution was absorbed on 200 g. of neutral alumina (activity III). Elution with petroleum ether, then with benzene/petroleum ether mixtures first gave about 2.3 g. (29%) of unchanged pregnenolone. Continued elution with 25/75 and 50/50 diethyl ether/benzene mixtures gave 3.0 g. of crude 3-hydroxy-5,6-N-cyanoaziridinopregnane-20-one, crystallization of which from acetone-hexane gave 1.68 g. (24% yield) of pure product, M.P. 161.5–162.5° C., $[\alpha]_D^{22}$ +46° (acetone, c.=1.15).

*Analysis.*—Calc'd for $C_{22}H_{32}N_2O_2$: C, 74.12; H, 9.05; N, 7.86. Found: C, 74.46; H, 9.25; N, 7.68.

The infrared spectrum agreed with the assigned structure, showing absorptions at 3400 cm.$^{-1}$ (OH), 2200 cm.$^{-1}$ (N—C≡N), and 1700 cm.$^{-1}$ C=O).

A solution of 2.5 g. of this steroid in 20 ml. of pyridine was added to the complex prepared from 2.5 g. of chromium trioxide and 30 ml. of pyridine. After stirring for 6 hours at room temperature, the brown reaction mixture was poured into 350 ml. of water containing 105 g. of sodium dihydrogen phosphate (pH 5). The aqueous mixture was filtered through sintered glass to give a brown solid and an aqueous filtrate. The filtrate was extracted with three 125 ml. portions of ethyl acetate, and the filter cake was extracted with three 150 ml. portions of boiling ethyl acetate. The combined extracts were washed with 10% aqueous sodium dihydrogen phosphate, then with a saturated aqueous solution of sodium chloride, and dried over sodium sulfate. Evaporation of the ethyl acetate solution under reduced pressure, followed by washing the solid residue with a few milliliters of methanol, gave 1.50 g. (60% yield) of 6-cyanoaminoprogesterone, M.P. 186–187° C. After recrystallization from methanol, the product melted at 188–189° C. Analyses showed that it contained 0.5 mole of methanol of crystallization.

*Analysis.*—Calc'd for $C_{22}H_{30}N_2O_2 \cdot 1/2CH_3OH$: C, 73.14; H, 8.45; N, 7.57. Found: C, 73.00; H, 8.11; N, 7.94.

Infrared: 1620 cm.$^{-1}$ (C=C); 1690 cm.$^{-1}$ (C=O); 2200 cm.$^{-1}$ (C≡N); 3260 cm.$^{-1}$ (NH).

Ultraviolet: $\lambda_{max.}^{EtOH}$ 233 m$\mu$ ($\epsilon$=12,900)

*Example 2.—21-acetoxy-6-cyanoamino-4-pregnene-3,20-dione*

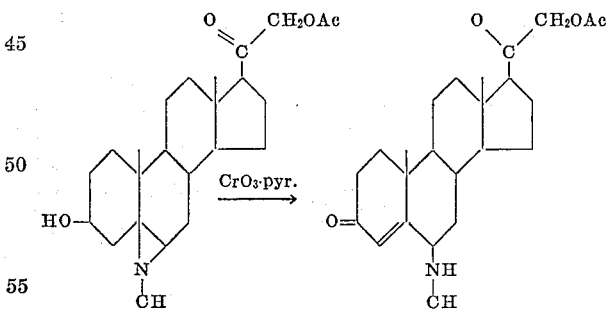

The starting material used in this example was prepared as follows:

To a solution of 9.35 g. (25 millimoles) of 21-acetoxy-3-hydroxy-5-pregnene-20-one in 145 ml. of ethyl acetate was added 12 ml. (34 millimoles) of 2.85 M cyanogen azide in ethyl acetate. The reaction mixture was heated at 50–53° C. for 44 hours, during which time 870 ml. (36 millimoles) of gas was evolved. The mixture was filtered to separate some solid material and the filter cake was washed with hot ethyl acetate. The combined ethyl acetate filtrates were evaporated under reduced pressure to give 12.1 g. of gummy residue which was redissolved in 25 ml. of ethyl acetate. This solution was absorbed on 400 g. of neutral alumina (activity IV). Elution with petroleum ether, benzene, and finally 1:1 ethyl acetate-benzene gave, in the latter eluate, a colorless glass that, on crystallization from acetone-ether, afforded 2.87 g. (28% yield) of crystalline 21-acetoxy-5,6 - N-cyanoaziridino-3-hydroxypregnane-20-one, M.P.

159–163° C. Recrystallization from the same solvent pair gave 2.33 g. of purer product as colorless needles, M.P. 161° C., and an additional crystallization afforded an analytical sample, M.P. 163.5° C., $[\alpha]_D^{22}+48°$ (acetone, C.=2.00).

Analysis.—Calc'd for $C_{24}H_{34}N_2O_4$: C, 69.53; H, 8.27; N, 6.76. Found: C, 69.72; H, 8.21; N, 6.77.

The infrared spectrum showed absorptions at 2200 cm.$^{-1}$ (NC≡N); 1750 cm.$^{-1}$ and 1730 cm.$^{-1}$ (C=O).

A mixture of 1.2 g. of this steroid with the complex prepared from 8 g. of chromium trioxide and 22 ml. of pyridine was stirred at room temperature for 22 hours, after which the reaction product was isolated by the procedure described in Example 1. There was obtained 0.80 g. (65% yield) of 21-acetoxy-6-cyanoamino-4-pregnene-3,20-dione (also called 6-cyanoamino desoxycorticosterone acetate), M.P. 153–156° C. after crystallization from acetone-benzene.

Analysis.—Calc'd for $C_{24}H_{32}N_2O_4$: C, 69.88; H, 7.82; N, 6.79. Found: C, 71.43; H, 7.74; N, 6.31.

Infrared: 3190 cm.$^{-1}$ (NH); 2210 cm.$^{-1}$ (C≡N); 1745, 1720 and 1675 cm.$^{-1}$ (ester, ketone and conjugated C=O); 1610 cm.$^{-1}$ (C=C); and 1230 cm.$^{-1}$ (ester C=O).

Ultraviolet: $\lambda_{max.}^{EtOH}$ 232 mμ ($\epsilon$=12,100)

*Example 3.—6-cyanoamino-17β-hydroxy-17α-methyl-4-androstene-3-one 6-cyanoamino-17α-methyltestosterone*

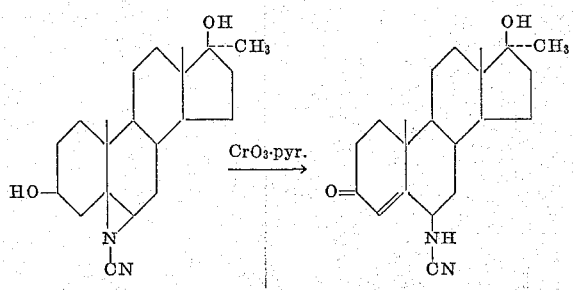

The starting material used in this example was prepared as follows:

A mixture of 10.0 g. (23 millimoles) of 17α-methyl-5-androstene-3β,17β=diol in 175 ml. of ethyl acetate and 15.0 ml. (42 millimoles) of a 2.85 M solution of cyanogen azide in ethyl acetate was heated at 50±2° C. for 48 hours, during which time a total of 965 ml. of gas (95% of theory) was evolved. The reaction mixture was filtered and the filter cake was washed with warm ethyl acetate. The combined filtrate and washings were evaporated, leaving about 10 g. of a light yellow solid which was redissolved in 25 ml. of ethyl acetate. This solution was absorbed on 600 g. of neutral alumina (activity IV). Elution with benzene and then with 1:5 ethyl acetate-benzene gave first 0.96 g. of unchanged starting material, then a glass-like solid which was crystallized from ethanol by slow addition of n-hexane to give 4.11 g. (36% yield) of 5,6-N-cyanoaziridino-17α-methylandrostane - 3β,17β-diol, M.P. 108–112° C., $[\alpha]_D^{22}$ −29° (acetone, c.=2.3). This product contained one mole of ethanol of crystallization.

Analysis.—Calc'd for $C_{21}H_{32}N_2O_2 \cdot C_2H_5OH$: C, 70.73; H, 9.81; N, 7.17. Found: C, 70.55; H, 9.72; N, 7.03.

The infrared spectrum supported the assigned structure, exhibiting a band at 2200 cm.$^{-1}$ (N—C≡N).

A solution of 0.70 g. of the above steroid in 8 ml. of pyridine was added to the complex prepared from 0.70 g. of chromium trioxide and 7 ml. of pyridine. The reaction mixture was stirred for 18 hours at room temperature and then poured into a solution of 10 ml. of concentrated sulfuric acid in 120 ml. of water. The resulting aqueous and solid phases were each extracted with two 75 ml. portions of ethyl acetate. The combined extracts were washed with 5% aqueous hydrochloric acid, dried, and evaporated, giving 0.328 g. (47% yield) of a colorless glassy residue of 6-cyanoamino-17β-hydroxy-17α-methyl-4-androstene-3-one. After three crystallizations from ethanol-water, the product was obtained as colorless crystals melting at 185–186° C. It was soluble in 5% aqueous sodium hydroxide, insoluble in aqueous sodium carbonate. It contained one-half mole of ethanol of crystallization.

Analysis.—Calc'd for $C_{21}H_3N_2O_2 \cdot 1/2C_2H_5OH$: C, 72.4; H, 9.10; N, 7.67. Found: C, 72.42; H, 8.82; N, 7.68.

Infrared: 3400 cm.$^{-1}$ (OH); 3180 cm.$^{-1}$ (NH); 2200 cm.$^{-1}$(N—C≡N) 1665 cm.$^{-1}$ (conjugated C=O); and 1610 cm.$^{-1}$ (C=C).

Ultraviolet: $\lambda_{max.}^{EtOH}$ 232 mμ ($\epsilon$=13,700)

*Example 4.—6-cyanoamino-4-cholestene-3-one*

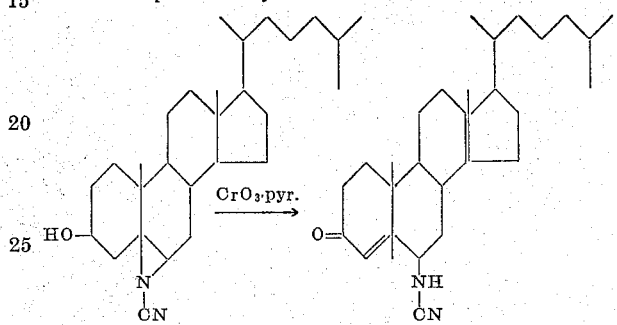

The starting material used in this example was prepared as follows:

A solution of cholesterol (19.3 g., 50 millimoles) in 135 ml. of ethyl acetate was dried over anhydrous calcium sulfate and the solution was filtered. To the filtrate was added 25 ml. (70 millimoles) of 2.85 M cyanogen azide in ethyl acetate and the mixture was heated at 50–53° C. for 50 hours, during which time a total of 1730 ml. (70 millimoles) of gas was evolved. Filtration of the reaction mixture and evaporation of the filtrate to dryness gave a gummy residue which was redissolved in 65 ml. of benzene. The solution was absorbed on 600 g. of neutral alumina (activity III). Elution with benzene, then with 30:70 ether-benzene gave 1.6 g. of oily product consisting chiefly of unchanged cholesterol. Continued elution with ether-benzene (50:50 by volume) gave an oil that, on crystallization from cyclohexane-petroleum ether, afforded 4.1 g. (20% yield) of 5,6-N-cyanoaziridinocholestane-3β-ol as feathery crystals, M.P. 142.5–143.5° C., $[\alpha]_D^{22}$ +16° (acetone, c.=1.48).

Analysis.—Calc'd for $C_{28}H_{46}N_2O$: C, 78.82; H, 10.87; N, 6.57. Found: C, 76.81; H, 10.58; N, 6.44.

The infrared spectrum indicated the presence of hydroxyl (339 cm.$^{-1}$) and cyanoamino (2200 cm.$^{-1}$) groups.

A mixture of 0.50 g. of the above steroid and 0.50 g. of chromium trioxide in 10 ml. of pyridine was stirred at room temperature for 5 hours. The reaction product was isolated by the procedure described in the preceding examples except that the precipitating liquid was water acidified to a pH of 1 with hydrochloric acid. There was obtained 0.329 g. of a white solid. This solid was dissolved in cyclohexane and petroleum ether was added. On standing overnight an oily solid precipitated. This was separated by decantation and redissolved in 3 ml. of cyclohexane. Chromatography of this solution on 15 g. of neutral alumina (activity III) gave, on elution with 1:1 ether-benzene, 0.192 g. of 6-cyanoamino-4-cholestene-3-one, M.P. 97.5–98.5° C. after recrystallization from cyclohexane-petroleum ether.

Analysis.—Calc'd for $C_{28}H_{44}N_2O$: N, 6.60. Found: N, 6.57.

The infrared spectrum supported the assigned structure, showing absorptions at 3200 cm.$^{-1}$ (NH); 2200 cm.$^{-1}$ (C≡N); 1670 cm.$^{-1}$ (conjugated C=O); and 1610 cm.$^{-1}$ (C=C).

Ultraviolet: $\lambda_{max.}^{EtOH}$ 233 mμ ($\epsilon$=12,200)

The foregoing examples are to be considered as illustrative rather than limitative, since the described process is broadly applicable to the preparation of a 3-keto-Δ⁴-6-cyanoamino steroid from any 3-hydroxy-5,6-N-cyanoaziridino steroid previously described.

Other specific examples of 3-keto-Δ⁴-6-cyanoamino steroids which can be prepared (with or without additional, conventional transformations such as, e.g., esterification, etherification or acetalization of hydroxyl groups) by the described procedure, such as that illustrated in Example 1, include those listed below opposite the formula of the starting 3-hydroxy-5,6-N-cyanoaziridino steroid.

| Starting material | Reaction product |
|---|---|
| (17β-OAc steroid with 3-HO, 5,6-N-CN aziridino) | 17β-Acetoxy-6-cyanoamino-4-androstene-3-one. |
| (steroid with side chain O—(CH₂)₂—CH(C₂H₅)—CH(CH₃)₂ with OCH₃; 3-HO, 5,6-N-CN aziridino) | 6-cyanoamino-4-stigmastene-3-one. |
| (17-keto steroid with 3-HO, 5,6-N-CN aziridino) | 6-cyanoamino-4-androstene-3,17-dione. |
| (17β-OH, 17α-CH₃ steroid with 3-HO, 5,6-N-CN aziridino, estrane) | 6-cyanoamino-17β-hydroxy-17α-methyl-4-estrene-3-one. |
| (steroid with side chain CH(CH₃)—(CH₂)₂—CH(CH₃)—CH(CH₃)₂; 3-HO, 5,6-N-CN aziridino) | 6-Cyanoamino-4-ergostene-3-one. |

| Starting material | Reaction product |
|---|---|
| 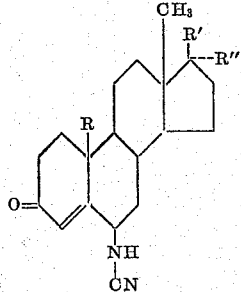 | 17α,20α-Diacetoxy-6-cyano-amino-4-pregnene-3-one. |
| 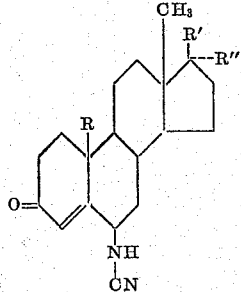 | 17α-Acetoxy-6-cyanoamino-4-pregnene-3,20-dione. |

Attachment of the cyanoamino function at the 6-position of the steroid nucleus, a key position especially in the biologically most active 3-keto-Δ⁴ system, affects the biological properties of the steroid molecule. For instance, introduction of the 6-cyanoamino group results in the elimination or reduction of the primary hormone effects such as androgenic activity. Thus, whereas the 6-unsubstituted hormonal steroids such as progesterone or 17α-methyltestosterone show progestational or androgenic activity, respectively, the 6-cyanoamino-3-keto-Δ⁴ steroids of this invention possess antiandrogenic activity. This was indicated by tests on male rats which showed a 25% involution of the ventral prostate gland following subcutaneous administration of the 6-cyanoaminoprogesterone of Example 1 and of the 6-cyanoamino-17α-methyltestosterine of Example 3, while the testes and levator ani muscles remained essentially unchanged. In addition, administration of 6-cyanoaminoprogesterone to estrogen-primed immature female rabbits followed by histological examination of their uteri showed that this compound had little or no progestational activity. This specificity shows usefulness of these compounds in the chemical treatment of prostatic hypertrophy, and it has the advantage of permitting administration of these products in relatively massive doses.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A steroid of the formula

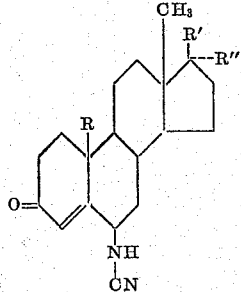

wherein R is selected from the class consisting of methyl and hydrogen; R' is selected from the class consisting of

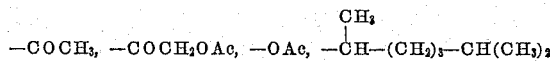

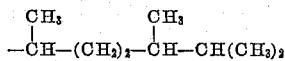

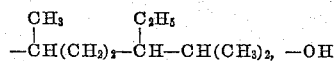

and $-CH(OAc)CH_3$; R'' is selected from the class consisting of $-H$, $-CH_3$ and OAc, wherein Ac is acetoxy; and R' and R'' taken together represent $=O$.

2. 6-cyanoamino-4-pregnene-3,20-dione.

3. 21-acetoxy-6-cyanoamino-4-pregnene-3,20-dione.

4. 6-cyanoamino-17β-hydroxy-17α-methyl-4-androstene-3-one.

5. 6-cyanoamino-4-cholestene-3-one.

6. A process for preparing the steroids of claim 1 which comprises oxidizing a 3-hydroxy-5,6-N-cyanoaziridino steroid having the substituents defined in claim 1, with a chromium trioxide/tertiary nitrogen base complex oxidizing agent, at a temperature of from 0° C. to 75° C.

7. The process of claim 6 in which the oxidizing agent is a chromium trioxide/pyridine complex.

8. A process for preparing 6-cyanoamino-4-pregnane-3,20 dione which comprises reacting 3-hydroxy-5,6-N-cyanoaziridinopregnane-20-one with a chromium trioxide/pyridine complex.

References Cited by the Applicant

Bowers et al., J. Am. Chem. Soc., 81, 5233 (1959).

LEWIS GOTTS, *Primary Examiner.*

UNITED STATES PATENT OFFICE
CERTIFICATE OF CORRECTION

Patent No. 3,201,426            August 17, 1965

George A. Boswell, Jr., et al.

It is hereby certified that error appears in the above numbered patent requiring correction and that the said Letters Patent should read as corrected below.

Column 1, line 69, for "C=N" read -- C-N --; column 4, lines 43 to 56, the formulas should appear as shown below instead of as in the patent:

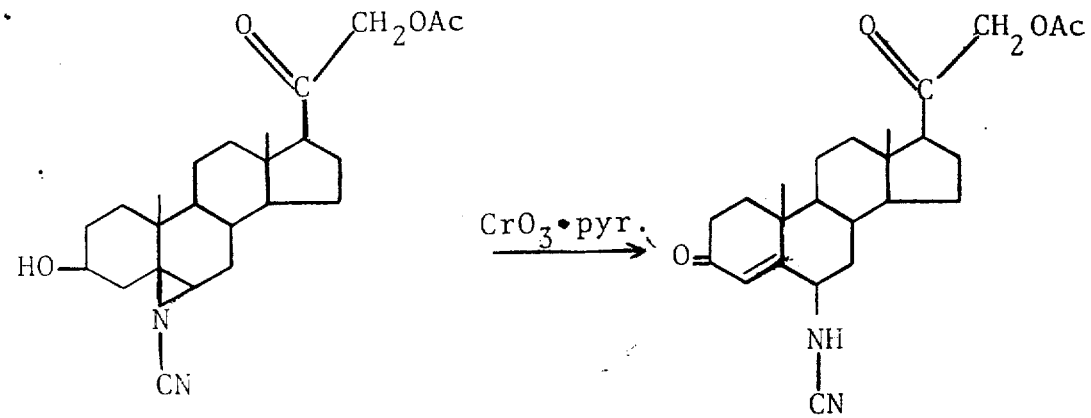

Column 5, lines 26 and 27, heading to Example 3 should appear in italics as shown below instead of as in the patent:

6-cyanoamino-17β-hydroxy-17α-methyl-4-androstene-3-one
    6-cyanoamino-17α-methyltestosterone Column 5, line 44, for "17β=diol" read -- 17β-diol --; column 6, line 8, for "$C_{21}H_3N_2O_2$" read -- $C_{21}H_{30}N_2O_2$ --; same column 6, lines 16 to 28, the right-hand formula should appear as shown below instead of as in the patent:

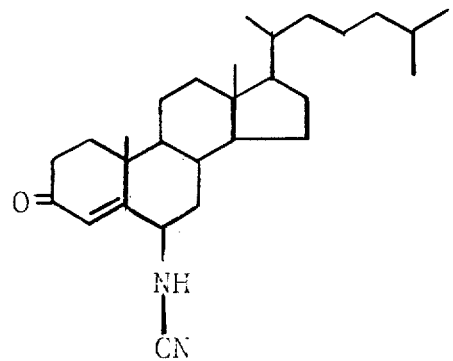

columns 7 and 8, in the table, first column, second formula thereof, the upper right-hand portion, for

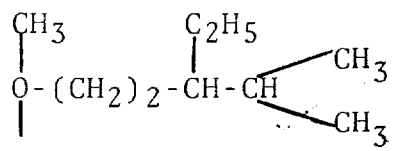  read  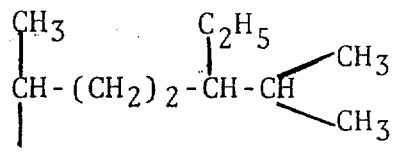

same table, first column, fourth formula thereof, the formula should appear as shown below instead of as in the patent:

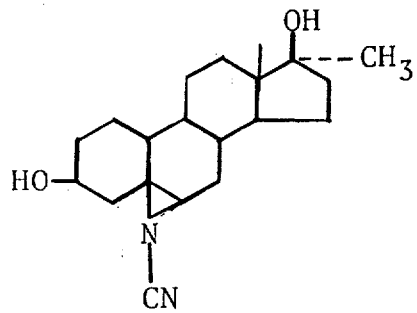

same table, first column, fifth formula should appear as shown below instead of as in the patent:

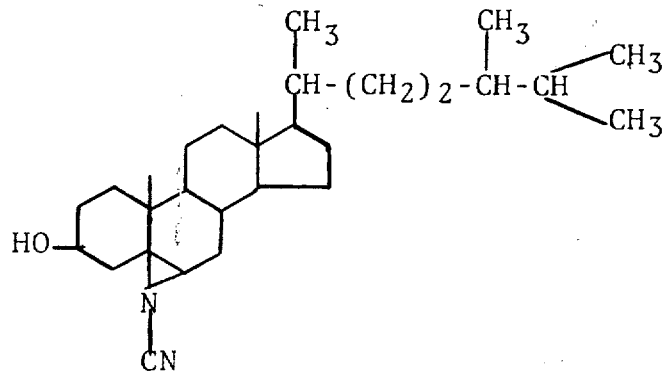

column 9, line 46, for "testosterine" read -- testosterone --; column 10, lines 66 and 67, for "-pregnane-3,20 dione" read -- -pregnene-3,20-dione --.

Signed and sealed this 22nd day of March 1966.

(SEAL)
Attest:

ERNEST W. SWIDER
Attesting Officer

EDWARD J. BRENNER
Commissioner of Patents